3,524,327
METHOD OF MAINTAINING ELECTRICAL APPARATUS AT VERY LOW TEMPERATURES
Emile Carbonell and Pierre Solente, Grenoble, France, assignors to L'Air Liquide, Société Anonyme Pour l'Etude et l'Exploitation des Procedes Georges Claude
Filed May 31, 1968, Ser. No. 733,447
Int. Cl. H02k 9/00; F17c 7/02
U.S. Cl. 62—52                                                    5 Claims

ABSTRACT OF THE DISCLOSURE

So as to reduce to very small values the energy losses due to the Joule effect, the electric conductors, particularly the turbo-alternators and the transformers of electricity generating stations have to be maintained at very low temperature. Preferably, the electric conductors of the transformers are cooled by heat exchange with a liquefied gas under a pressure slightly higher than atmospheric pressure, and sufficiently supercooled for the heat exchange not to cause the boiling thereof, and those of turbo-alternators are cooled by heat exchange with a liquefied gas at its boiling point. The liquid reheated by heat exchange with the transformers is expanded and sent with the liquid partially vaporized in heat exchange with the turbo-alternators into a cooling exchanger and then into a separator.

---

The present invention relates to a method of maintaining the electric conductors of voltage transformers and of turbo-alternators at very low temperatures, below about 21° K., in which the electric conductors of the transformers are cooled by heat exchange with a liquefied gas under a pressure slightly higher than the atmospheric pressure, and sufficiently super-cooled for the heat exchange not to cause the boiling thereof, and those of turbo-alternators by heat exchange with a liquefied gas at its boiling point. This method is particularly applicable to maintaining at very low temperature the electricity generating stations in which the electric conductors of the different units, particualrly the turbo-alternators and the transformers, are cooled to very low temperature, so as to reduce to very small values the energy losses due to Joule effect.

It is in fact known that certain metals in a very pure state, particularly aluminum, see their electrical resistivity reduced to a considerable proportion if they are brought to very low temperature. The release of heat by Joule effect is then to be absorbed by heat exchange with cryogenic fluids. However, the energy consumption of a cold-production cycle at low temperature, for a production of a constant cold input, increases rapidly when the level of the low temperature is lowered. It is understood that accordingly an optimum temperature level of the electric conductors exists, for which the energy consumption is minimal. In the case of very pure aluminium, this optimum level is in the region of 15 to 17° K.

It is only possible to obtain an absolutely fixed temperature level by heat exchange with a boiling liquid. However, the temperature level of 15 to 17° K. is below the boiling point under atmospheric pressure, 20.4° K., of liquid hydrogen, the only cryogenic liquid which can be used in this range of temperatures. Even if it is possible in theory to obtain a temperature of 15 to 17° K. by boiling liquid hydrogen under vacuum, this cannot be undertaken industrially, because of the danger of explosion which would be caused by any re-entry of air into a circuit containing hydrogen. In addition, neither gaseous hydrogen nor gaseous helium are good dielectrics, contrary to liquid hydrogen.

In U.S. patent application Ser. No. 711,799, filed Mar. 8, 1969 filed by the applicants, now Pat. No. 3,436,453; granted July 22, 1969 for: "Method of Maintaining Electric Apparatus at Very Low Temperature," there is described the cooling of electric conductors of transformers by heat exchange with liquid hydrogen under a pressure slightly higher than atmospheric pressure and sufficiently super-cooled for the heat exchange not to produce the boiling thereof, and the cooling of the electric conductors of turbo-alternators by heat exchange with gaseous helium. Although this method functions satisfactorily, it has the following disadvantages:

(a) the cooling of the transformers is effected in the region of 20° to 21° K., and thus at a temperature level appreciably higher than that of 15° to 17° K., corresponding to the minimum energy expenditure.

(b) the cooling of the turbo-alternators is effected by heat exchange with a gas of low calorific capacity, which is thus heated up to an appreciable degree during the heat exchange, so that the latter must start below 15° K. and end above 17° K.; the heat exchange zone thus no longer corresponds to a minimum energy expenditure.

The present invention has for its object to overcome the aforementioned disadvantages and to effect the cooling of transformers and of turbo-alternators entirely in the zone from 15° to 17° K., corresponding to the minimum energy expenditure, while requiring for the compensation of the cold losses only a simple refrigeration circuit and a reduced amount of equipment, comprising in particular only a single compressor. It is characterised by using, for the cooling of the transformers and of the turbo-alternators, a liquid mixture of hydrogen and helium, in proportions such that the boiling point of the liquid in the region of atmospheric pressure is close to 15 to 17° K.

In addition, it preferably comprises the following working procedures, separately or in combination:

(a) the mixture of hydrogen and helium is produced in the liquid state in the region of atmospheric pressure and the liquid sent in heat exchange with the transformers is brought beforehand by pumping to a higher pressure;

(b) the liquid re-heated by heat exchange with the transformers is expanded and sent with the partially vaporised liquid in heat exchange with the turbo-alternators into a cooling exchanger and then a separator; the liquid which is separated out therein is returned for the heat exchange operations with the transformer and the turbo-alternators;

(c) the mixture of hydrogen and helium contains a proportion of hydrogen higher than the content of the vapour phase in thermodynamic equilibrium with liquefied hydrogen in the region of atmospheric pressure, and under a temperature close to 15° to 16° K., and the vapour phase in equilibrium with the liquefied hydrogen, discharged from the separator, has added thereto a fraction of the liquefied hydrogen in a proportion such that the total content of the hydrogen obtained is that of the initial mixture of hydrogen and helium, then reheated in the presence of this fraction during vaporisation and the gaseous mixture obtained is recycled for the liquefaction operation.

(d) the mixture contains about 40% of hydrogen and 60% of helium, and the compensation for the losses of cold is assured by expansion with external work of a part of the gaseous mixture cooled to approximately 43° K. from an absolute pressure at least equal to 20 bars to a pressure close to atmospheric pressure.

(e) the mixture contains about 50% of hydrogen and 50% of helium, and the compensation for the losses of cold is assured by expansion with external work of a part of the gaseous mixture cooled to about 100° K. from an absolute pressure at least equal to 20 bars to an absolute pressure close to 8 bars, followed by a cooling by heat exchange towards 33° K. and a fresh expansion with external work to close to atmospheric pressure.

Other features and advantages of the invention will appear from the following description, given as non-limiting examples, of two installations for maintaining at very low temperature an electric energy generating station comprising turbo-alternators and transformers.

Figure 1:
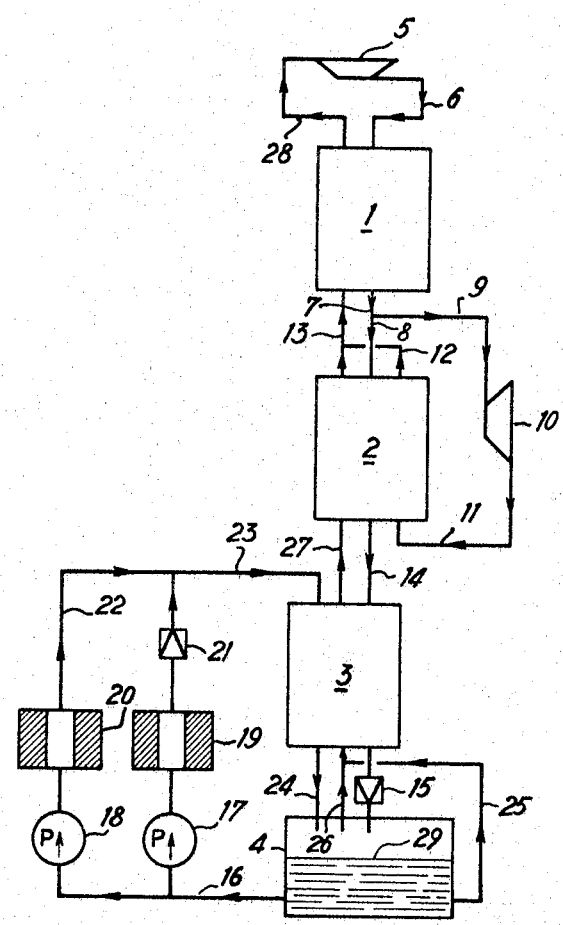
FIG. 1 represents an installation in which the refrigerating fluid is a mixture of 40% of hydrogen and 60% of helium, and the production of cold to 19° K. is assured by a single expansion turbine.

In the installation illustrated in FIG. 1, a gaseous mixture with 40% by volume of hydrogen and 60% of helium, under an absolute pressure of 1.2 bars, is brought by the turbo-compressor 5 to an absolute pressure of 21 bars; it enters the heat exchanger 1, and it is cooled therein towards 43° K. in heat exchange with the recycled cold gas at low pressure. Discharged from said exchanger by way of the conduit 7, it is divided into two portions. One portion, forming about 35% of the total, is directed via the condut 8 to the following exchanger 2. The other portion is conveyed via the conduit 9 to the expansion turbine 10. It is expanded therein to an absolute pressure of about 1.5 bars, while being cooled to 19° K. It then returns via the conduct 11 to the cold end of the exchanger 2, is reheated therein in counter-current with the first portion and is then recombined via the conduit 12 with the low pressure recycled gas at the hot end of this exchanger.

The first fraction of the gaseous mixture under pressure, cooled to about 19.5° K. in the exchanger 2, passes through the conduit 14 into the exchanger 3. It is cooled therein to about 16° K., and then is introduced via the expansion valve 15 at 1.5 bars into the reservoir 4. The liquid fraction thus formed is collected in the liquid hydrogen bath 29. The remaining gaseous fraction, contanining about 85% of helium, is discharged from the reservoir 4 through the conduit 26 towards the exchanger 3. By way of the conduit 25, said fraction has added thereto a quantity of liquid hydrogen sufficient to re-establish the initial composition of the compressed mixture (about 30% of the quantity entering the reservoir 4 via the valve 15). The hydrogen-helium mixture is vaporised and is reheated in the exchanger to about 18° K., then passes successively through the conduits 27 and 13 into the exchangers 2 and 1, where it is reheated to ambient temperature before being recycled through the conduit 28 to the intake of the compressor 5.

The liquid hydrogen at about 15.5° K., containing a little dissolved helium, is sent from the bath 4 through the conduit 16 towards the turbo-alternators and the transformers to be kept at a low temperature. A first portion is brought under a slight excess pressure by the pump 17 and directed into the ducts in thermal contact with the windings of the transformers, indicated diagrammatically at 19. Reheated in this way towards 19° K., it is expanded in the valve 21 to 1.5 bars and combined with the other portion coming from the turbo-alternators via the conduit 22. The second portion is conveyed by the circulation pump 18 into the ducts in thermal contact with the conductors of the turbo-alternators, represented diagrammatically at 20, which it cools while being partially vaporised. It is combined via the condut 22 with the first portion expanded in the valve 21. The combined flow is returned via the conduit 23 into the exchanger 3, where it is re-liquefied and cooled to 16° K. before being re-introduced via the conduit 24 into the reservoir 4.

The refrigeration cycle as described above consumes a power of about 80 kw. per kw. of refrigerating power supplied at the level of 16° to 17° K. This efficiency could moreover even be slightly improved by bringing the hydrogen-helium mixture to a slightly raised pressure of about 30 bars.

Figure 2:
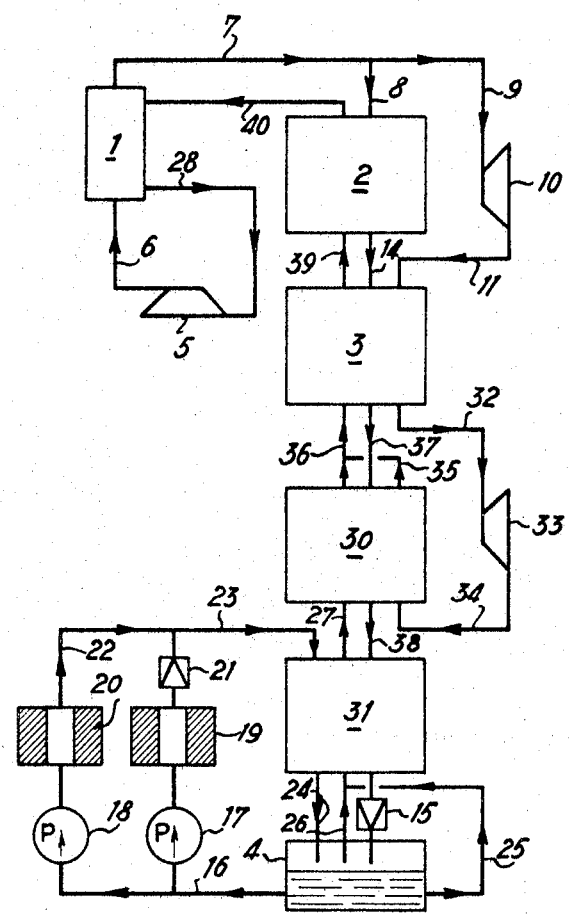
FIG. 2 represents an installation in which the refrigerating fluid is a mixture comprising 50% of hydrogen and 50% of helium, and the production of cold to 19° K. is assured by two expansion turbines at different temperature levels.

In the installation illustrated in FIG. 2, a gaseous mixture comprising 50% by volume of hydrogen and 50% of helium is brought by the turbo-compressor 5 to an absolute pressure of 21 bars. It passes via the conduit 6 into the exchanger 1, in which it is cooled to about 102° K. in heat exchanger with the re-cycled mixture at low pressure. Discharged from said exchanger through the conduit 7, it is divided into two portions. The first portion, forming about 32.5% of the total, passes through the conduit 8 to the exchanger 2, where it is once again cooled to the region of 81° K. in heat exchange with the gaseous mixture at low pressure. It then passes successively through the conduits 14, 37 and 38 into the exchangers 3, 30 and 31, where it is cooled to 16° K. in heat exchange with the low pressure gaseous mixture and, in the exchangers 30 and 31, with the second portion cooled in the expansion turbines, as will hereinafter be mentioned. The first portion is finally expanded in the valve 15 to 1.5 bars absolute and introduced, partially liquefied, into the reservoir 4.

The second portion of the gaseous mixture, withdrawn from the hot end of the exchanger 2 and forming about 67.5% of the total, passes through the conduit 9 into the turbine 10, where it is expanded with external work to 8 bars absolute, while being cooled to about 81° K. It is cooled once again in the exchanger 3 to 33° K. by heat exchange with the gaseous mixture recycled at low pressure, and then it passes through the conduit 32 to the turbine 33. It is expanded therein to 1.5 bars absolute while being cooled to about 19° K. It is then returned through the conduit 34 to the cold end of the exchanger 30 and is reheated therein to 28° K., before being combined via the conduit 35 with the gaseous mixtures recycled at low pressure at the hot end of the exchanger 30.

Liquid hydrogen, containing a little dissolved helium, drawn off from the reservoir 4, is sent via the conduit 16 to the power station to be maintained at low temperature. A first portion is brought under slight excess pressure by the pump 17 and directed into the ducts in good thermal contact with the windings of the transformers, represented diagrammatically at 19. It ensures the cooling thereof while being reheated without boiling, and then it is expanded in the valve 21 to its initial pressure of 1.5 bars absolute. The second portion is directed by the circulation pump 18 into the ducts in good contact with the windings of the turbo-alternators, represented diagrammatically at 20. It cools them, while partially vaporising, and is then combined by way of the conduit 22 with the first portion; the combined flow is returned through the conduit 23 to the hot end of the exchanger 31, where it is re-liquefied; it is finally re-introduced via the conduit 24 into the reservoir 4.

The gaseous mixture of helium and hydrogen, in equilibrium with the liquid hydrogen of the reservoir 4, is withdrawn via the conduit 26 and sent to the exchangers 31, 30; 3, 2 and 1, for the purpose of being reheated. However, in order to re-establish its composition with the initial value, liquid hydrogen in suitable quantity (about 40% of the amount entering the reservoir 5 by way of the valve 15) is added to it via the conduit 25 at the cold end of the exchanger 31. The mixture, vaporised and reheated to about 18.5° K. in the exchanger 31, passes via the conduit 27 into the exchanger 30, where it is once again reheated to about 28° K. Having mixture expanded in the turbine 33 added to it via the conduit 35, it passes successively through the conduits 36, 39 and 40 into the exchangers 3, 2 and 1, where it is reheated to the region of ambient temperature, before being returned via the conduit 28 to the intake of the compressor 5.

The refrigeration cycle as described above consumes a power of about 66 kw. per kw. of refrigerating power supplied at the level of 16° to 17° K. This efficiency could however be further improved to a slight degree by using a gaseous mixture with a slightly higher hydrogen content.

It will be understood that various modifications can be incorporated into the installations which have just been described, without departing from the scope of the invention. In particular, the number of expansion turbines can be increased, so that each heat exchanger has associated therewith a turbine in which is expanded a part of the gaseous mixture at high pressure, withdrawn at the hot end of the said exchanger and returned to its cold end. The arrangement of the expansion turbines can also be adapted, as is done in the Claude and Brayton cycles with a single fluid (hydrogen or helium), in such a way that the variations in temperature along the exchange line are reduced to the maximum degree. The supply of cold necessary towards the hot part of the apparatus can also be assured by a bath of liquid nitrogen, in which is immersed an exchanger, into which passes the hydrogen-helium mixture under pressure. The gaseous mixture of hydrogen and helium can be compressed to a fairly high pressure, for example about 30 bars.

We claim:

1. In a method of maintaining at very low temperatures, below about 21° K., the electric conductors of voltage transformers and turbo-alternators, in which the electric conductors of the transformers are cooled by heat exchange with a liquefied gas under a pressure slightly higher than atmospheric pressure, and sufficiently supercooled for the heat exchange not to produce the boiling thereof, and those of the turbo-alternators by heat exchange with a gas liquefied at its boiling point; the improvement comprising, for the cooling of the transformers and the turbo-alternators, using hydrogen in the presence of helium, proportioning the liquid hydrogen and helium such that the boiling point of the liquid at approximately atmospheric pressure is close to 15° to 17° K., expanding the liquid heated by heat exchange with the transformers, sending the expanded liquid and the partially vaporized liquid from the turbo-alternators heat exchangers into a cooling exchanger and then to a separator and returning the liquid which is separated out to the heat exchangers of the transformers and turbo-alternators.

2. A method as claimed in claim 1, and producing said mixture of hydrogen and helium in the liquid state in the region of atmospheric pressure, and pumping to a higher pressure the liquid in heat exchange with the transformers before bringing said liquid into heat exchange with the transformers.

3. A method as claimed in claim 1, and setting the proportion of hydrogen in the mixture of hydrogen and helium higher than the content of the vapor phase in thermal equilibrium with the hydrogen liquefied in the region of atmospheric pressure and under a temperature close to 15° to 16° K., adding to the vapor phase in equilibrium with the liquefied hydrogen discharged from the separator a fraction of the liquefied hydrogen in proportions such that the total content of hydrogen obtained is that of the initial hydrogen-helium mixture, then reheating the last-named vapor phase in the presence of the last-named fraction undergoing vaporization, and recycling the gaseous mixture thus obtained for the liquefaction operation.

4. A method as claimed in claim 1, and setting the content of the hydrogen-helium mixture at about 40% hydrogen and 60% helium, and expanding with external work part of the gaseous mixture cooled to about 43° K. from an absolute pressure at least equal to 20 bars to a pressure close to atmospheric pressure thereby to compensate for cold losses.

5. A method as claimed in claim 1, and setting the content of the hydrogen-helium mixture at about 50% of hydrogen and 50% of helium, expanding with external work part of the gaseous mixture cooled to about 100° K. from an absolute pressure at least equal to 20 bars to an absolute pressure close to 8 bars, cooling the work-expanded mixture by heat exchange toward 33° K., and further work expanding the cooled mixture to the region of atmospheric pressure, thereby to compensate for cold losses.

References Cited
UNITED STATES PATENTS

| | | | |
|---|---|---|---|
| 2,065,660 | 12/1936 | Dallenbach | 62—514 X |
| 3,375,675 | 4/1968 | Trepp et al. | 62—514 X |
| 3,415,077 | 12/1968 | Collins | 62—514 |
| 3,320,443 | 5/1967 | Klein | 310—52 X |

ROBERT A. O'LEARY, Primary Examiner

A. W. DAVIS, JR., Assistant Examiner

U.S. Cl. X.R.

62—54, 335, 514; 174—15; 310—52; 336—55, 57